United States Patent [19]

Borsuk et al.

[11] B 3,990,357
[45] Nov. 9, 1976

[54] GANG-TYPE PRODUCT KNOCKOUT AND RECEIVING MEANS

[75] Inventors: Alvin Borsuk; Charles H. Johnson, both of Madison, Wis.

[73] Assignee: Oscar Mayer & Co. Inc., Madison, Wis.

[22] Filed: Mar. 11, 1975

[21] Appl. No.: 557,299

[44] Published under the second Trial Voluntary Protest Program on February 3, 1976 as document No. B 557,299.

[52] U.S. Cl. ................................. 99/355; 99/427; 99/443 C; 99/448; 426/389; 426/513
[51] Int. Cl.² ................................................ A47J 27/12
[58] Field of Search ............ 99/349, 351, 355, 416, 99/443 C, 427, 441, 448; 426/512, 513, 516, 389, 517, 523

[56] References Cited
UNITED STATES PATENTS

| | | | |
|---|---|---|---|
| 3,039,136 | 6/1962 | Toepper | 99/351 |
| 3,122,243 | 2/1964 | Hawley | 99/443 |
| 3,132,950 | 5/1964 | Macy | 99/427 X |
| 3,167,000 | 1/1965 | Sassen | 99/441 X |
| 3,638,554 | 2/1972 | Ackroyd | 99/351 |
| 3,796,144 | 3/1974 | Foldenauer | 99/355 |

*Primary Examiner*—Billy J. Wilhite
*Attorney, Agent, or Firm*—Lockwood, Dewey, Zickert & Alex

[57] ABSTRACT

A product knockout and receiving means for removing a loaf meat from a mechanism of loaf molds including a gang of knockout bars, one each in alignment with each mold for engaging and pushing a plug within the mold to drive the loaf meat product from the mold, and a gang of receiving means (such as trays) for receiving the loaf meat product as it is removed from the molds.

13 Claims, 10 Drawing Figures

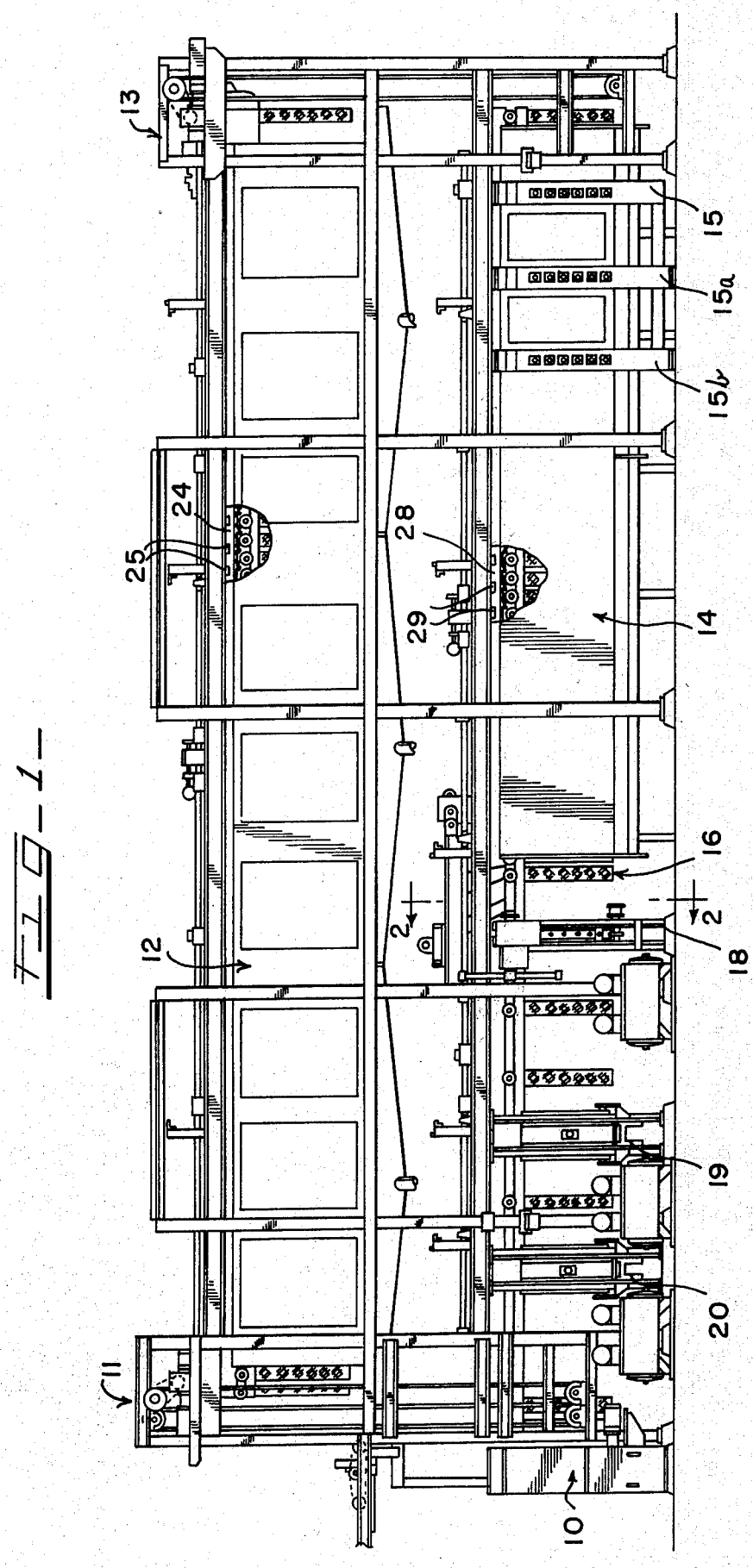

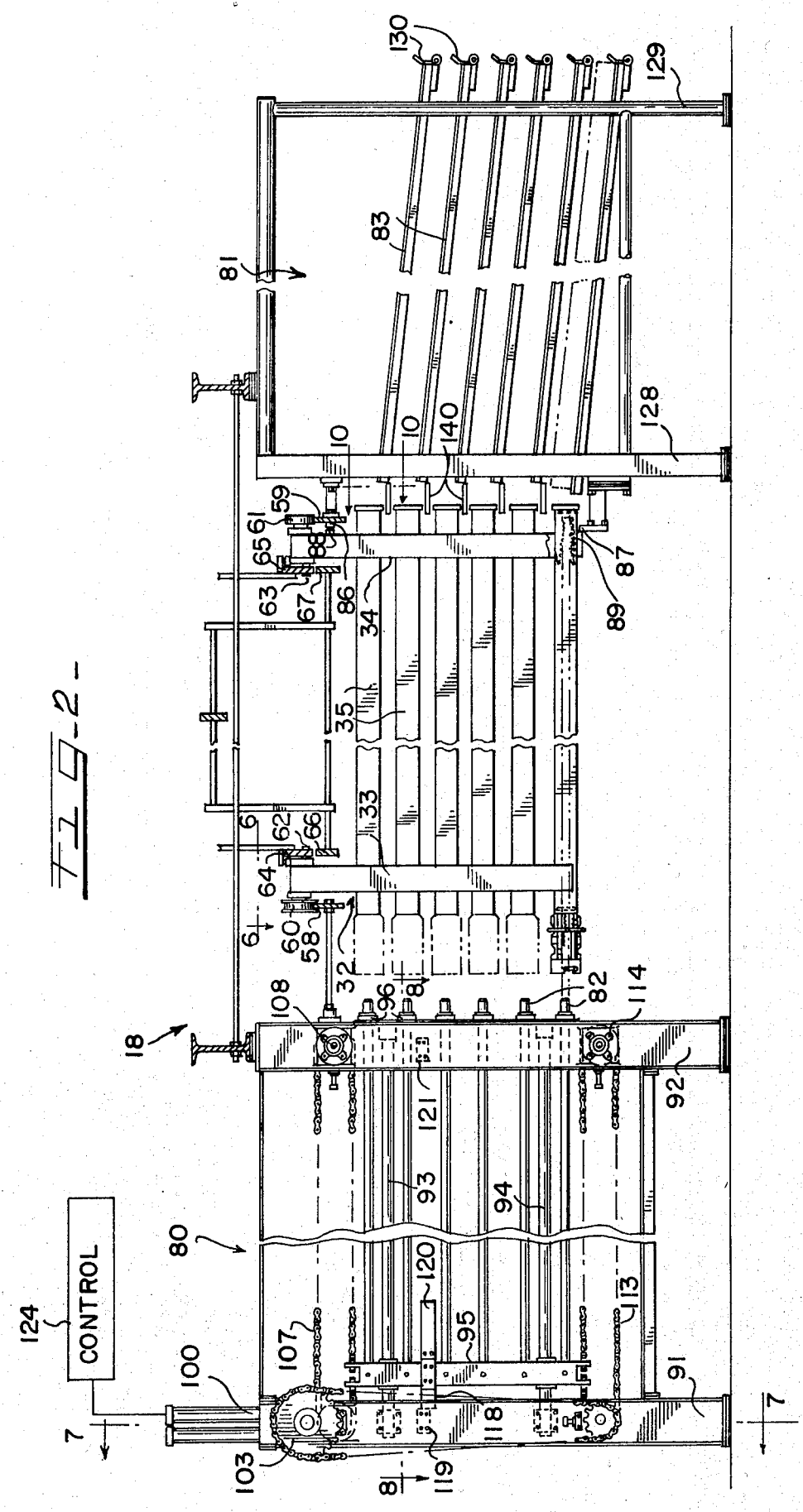

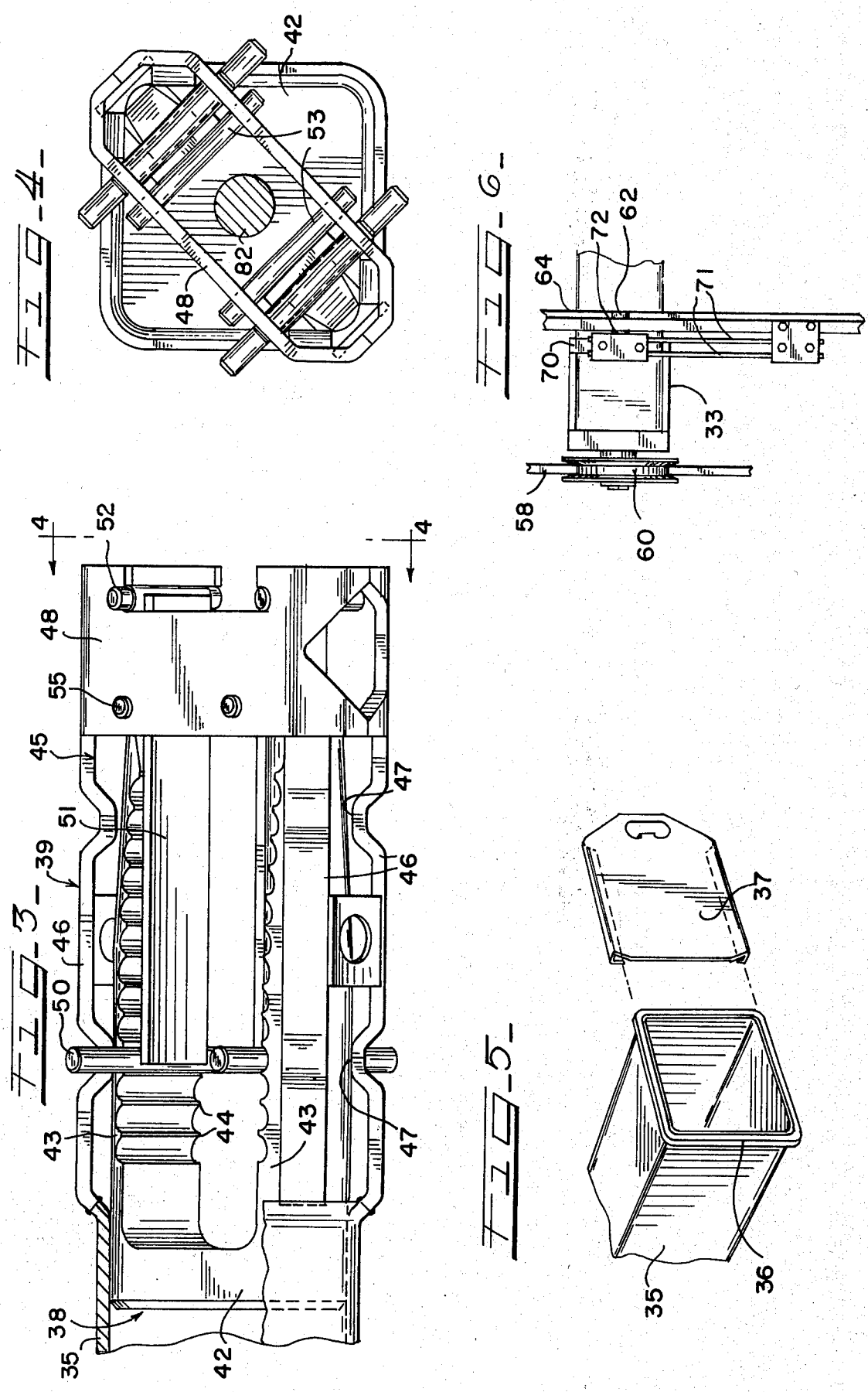

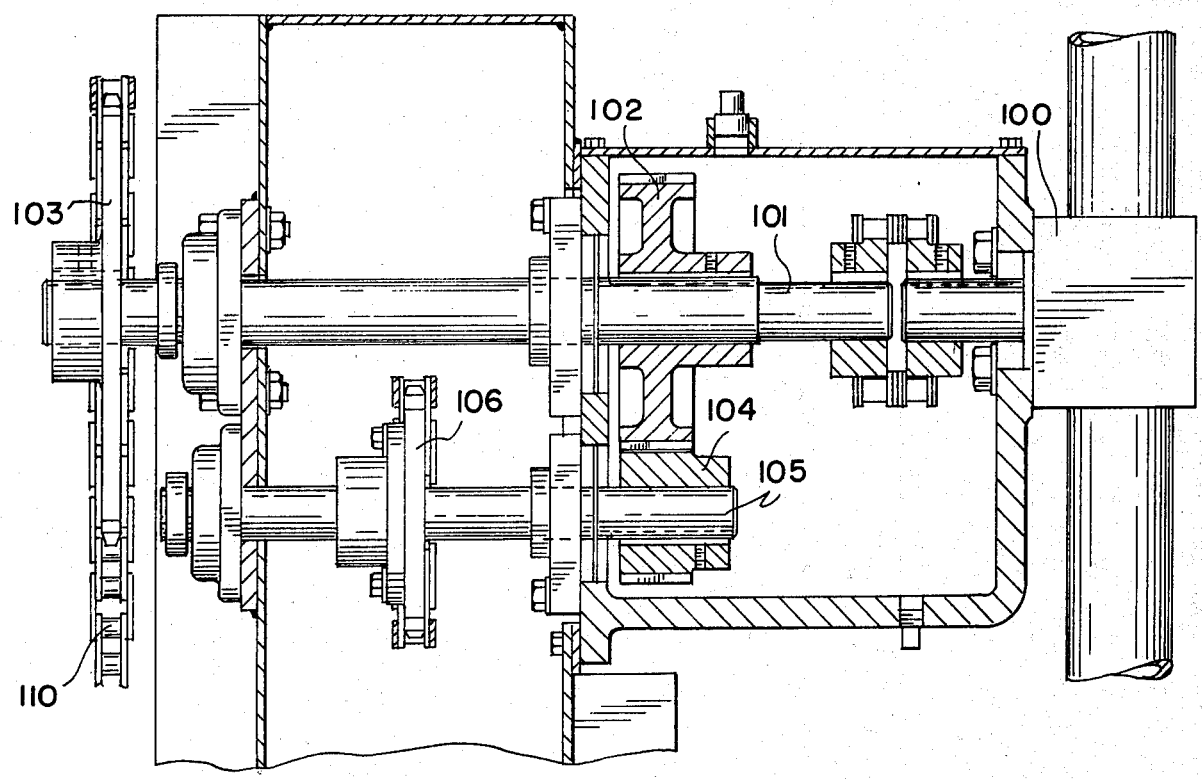
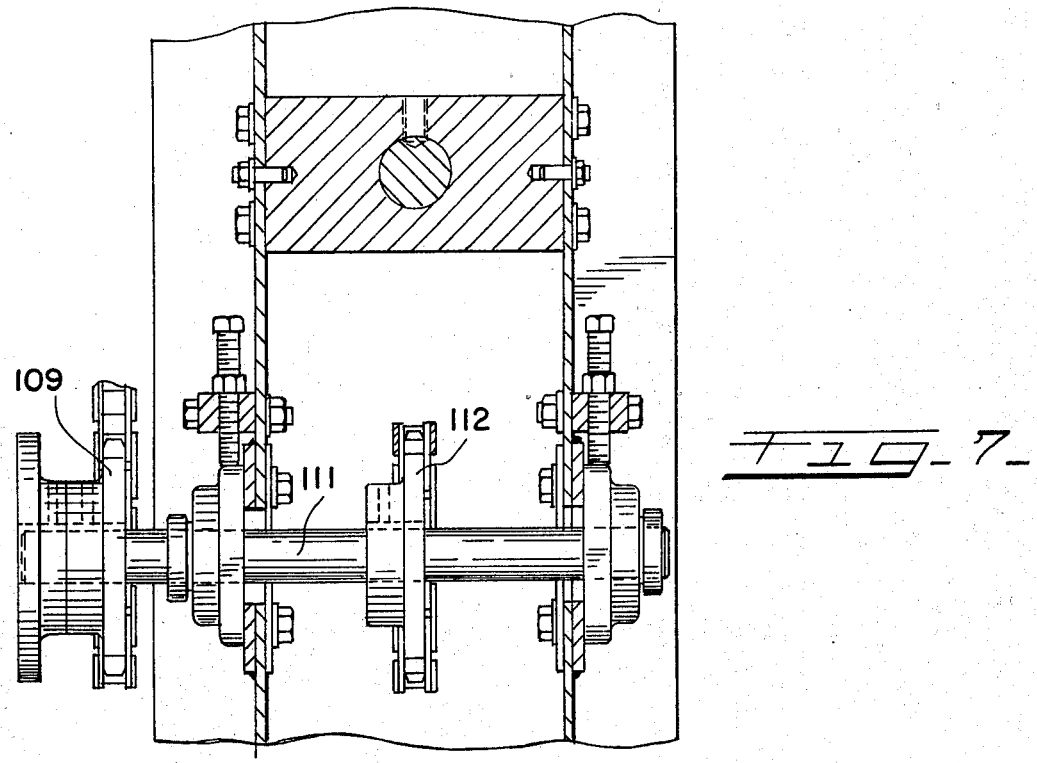
Fig. 7.

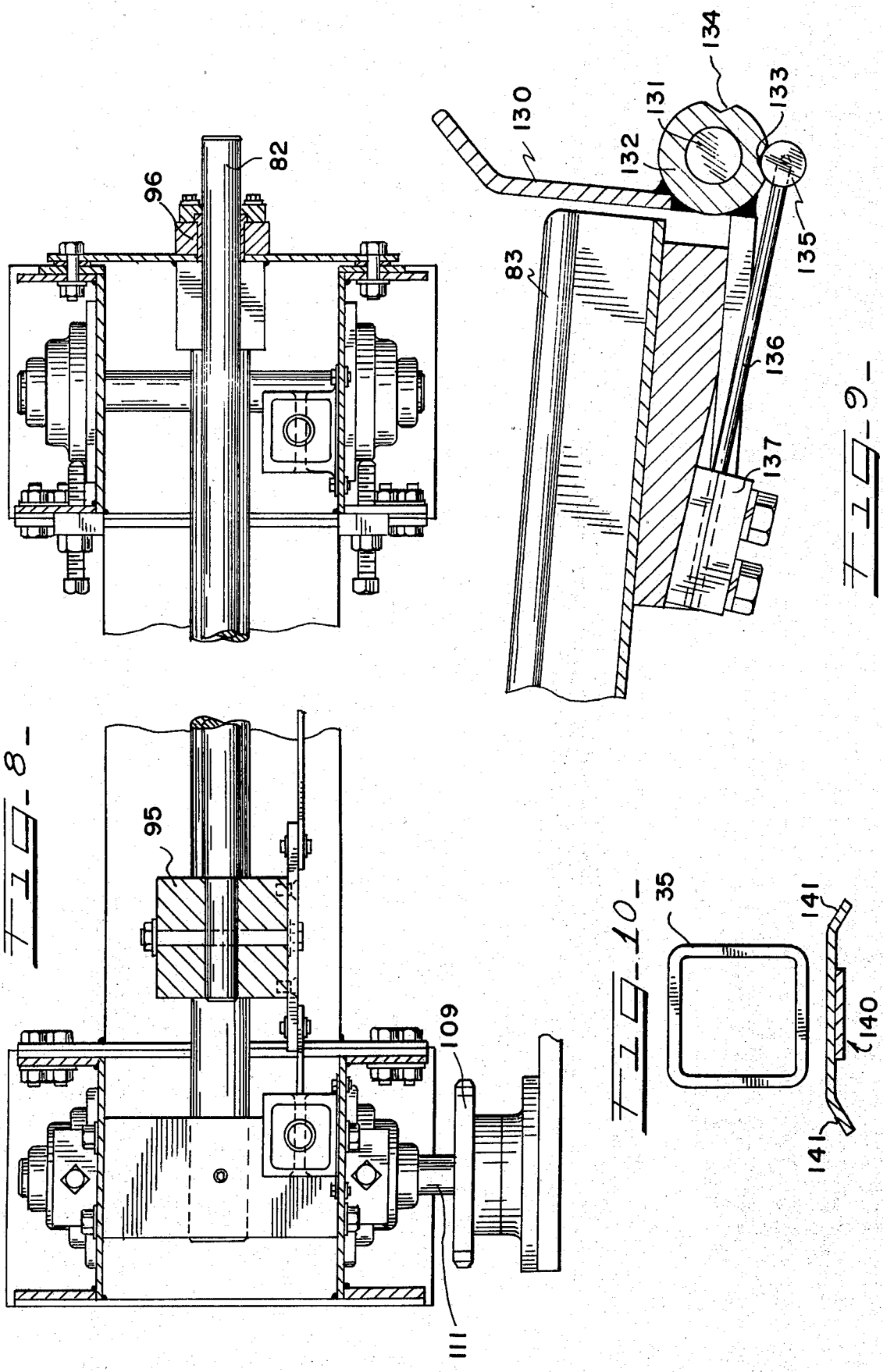

GANG-TYPE PRODUCT KNOCKOUT AND RECEIVING MEANS

This invention relates in general to a continuous processing system for making a loaf food product by processing food material in loaf molds, and more particularly to a product knockout and receiving means for removing the food product from the molds.

The product knockout and receiving means of the present invention is employed in a continuous loaf processing system where a stuffable food product is stuffed into molds which are subjected to heat for cooking the food material and to chilling for thereafter cooling the food material prior to removal of the food material from the molds. While any type of moldable food product may be made with the continuous loaf processing system, a loaf meat product may be efficiently and economically processed with the system. Accordingly, reference hereafter will essentially be to the handling of a stuffable meat material, such as sausage batter or chunk meat, to produce a loaf meat product.

The continuous loaf processing system involves the use of a plurality of magazines of loaf molds which are first coated with a suitable release agent and then stuffed with a meat material. The stuffed molds in magazines of molds are subjected to heat for a predetermined time to cook the meat material within the molds. During cooking, expansion of the meat material is compensated for by a movably positionable plastic plug within the mold at one end thereof. The plug is also movable through the mold during product knockout. The other end of the mold is closed by a removable cover. Following the cooking operation, the magazines are moved through a chilling station to chill the meat material prior to removal of the meat material from the molds. During chilling, contraction or shrinkage of the meat material is experienced, and since it is desired to ultimately provide a loaf meat product having a uniform cross-sectional dimension so that meat sliced from the mold will be uniform, the meat material is squeezed during the chilling thereof by applying a force to the mold plugs. The mechanism for applying a squeezing force to the product forms no part of the present invention, and is the subject matter of another application owned by the assignee of this application.

The loaf meat product in the molds following processing must be removed without damaging the surface of the product in order to provide a quality product. The present invention achieves proper removal of the loaf meat product from the molds by providing a bank of knockout bars for applying a force against the plastic plugs within the loaf molds to drive the plug and force the loaf meat product from the removable cover end of the mold. Receiving trays are provided for receiving the loaf meat product as it is removed from the molds. The knockout bars are hydraulically operated and retracted following removal of the loaf meat to their home position so that the magazine of molds can thereafter be advanced out of the product knockout station.

It is therefore an object of the present invention to provide a product knockout and receiving means for removing the loaf meat product from molds in which the meat product has been processed.

Another object of the present invention is in the provision of a gang-type product knockout and receiving tray assembly for simultaneously pushing the meat loaves from the molds of a magazine after the meat product has been processed in the molds.

Other objects, features and advantages of the invention will be apparent from the following detailed disclosure, taken in conjunction with the accompanying sheets of drawings, wherein like reference numerals refer to like parts, in which:

FIG. 1 is a side elevational view of a continuous loaf processing apparatus which utilizes the gang-type product knockout and receiving tray assembly of the invention;

FIG. 2 is an elevational view of the product knockout and receiving tray assembly and taken generally along line 2—2 of FIG. 1;

FIG. 3 is a greatly enlarged elevational view of the end of a mold where the movably positionable product is located during processing of the meat material in the mold;

FIG. 4 is an elevational view of the end of the mold with the plug taken along line 4—4 of FIG. 3;

FIG. 5 is a perspective exploded view of the end of a mold having the removable cover;

FIG. 6 is a top plan view taken substantially along line 6—6 of FIG. 2 showing the anti-sway bar mechanism;

FIG. 7 is an enlarged broken vertical sectional view taken substantially along line 7—7 of FIG. 2 to illustrate the drive mechanism of the knockout bars;

FIG. 8 is an enlarged partially broken sectional view taken substantially along line 8—8 of FIG. 2;

FIG. 9 is an enlarged sectional view taken through the outer end of a receiving tray and illustrating the detented stop; and FIG. 10 is an enlarged sectional view taken substantially along line 10—10 of FIG. 2 to illustrate the splash deflector plate at the inlet end of a receiving tray.

Referring now to the drawings, and particularly to FIG. 1, an overall view of the continuous loaf processing apparatus in which the product knockout mechanism of the present invention is utilized includes a stuffer 10 at a stuffing station which loads molds in a magazine with a stuffable meat material. Thereafter, the magazine of molds is transferred by the transfer means 11 to the cooking station 12, where the molds are subjected to heat for a predetermined period of time to cook the meat material within the molds. Following the cooking operation, the magazines are transferred one at a time by means of a lowerer 13 at the discharge end of the cooking station to the inlet end of a chilling station 14. At three different positions within the chilling station 14, mechanisms 15, 15a and 15b are provided for applying a squeezing force to the meat material within the molds. Thereafter, mold covers are manually removed at station 16, and the product is knocked out of the molds at the knockout station 18. The magazines of molds are further processed prior to a subsequent stuffing operation at a wash station 19 and a release agent application station 20.

During cooking, the meat material expands, and during chilling, the meat material contracts or shrinks. Moreover, air pockets may develop in the meat material during stuffing and/or cooking and these pockets permit rendering. Shrinkage of the meat material during chilling causes spacing between the mold sides and the loaf meat, resulting in "mottling," which is objectionable. In order to overcome the irregularities in loaf dimension, a mechanism for applying a squeezing force eliminates any possible air and fat pockets and compensates for shrinkage to ultimately provide a uniform cross-sectionally dimensioned loaf meat product. The squeezing mechanism forms no part of the present invention, but is the subject matter of another application owned by the assignee of this application. Thereafter, slicing of the loaves will provide uniformly dimensioned slices without voids and an overall high quality product.

While heat may be applied to the molds at the cooking station in any suitable manner, it will be appreciated here that the cooking station includes a cooking chamber 24 having a plurality of hot water spray nozzles 25 overhead which distribute hot water onto the molds as they are incrementally moved through the cooking chamber. Similarly, the chilling station 14 includes chilling chamber 28 having overhead cold water spray nozzles 29 for distributing cold water onto the molds to obtain a chilling action.

A magazine assembly of molds, to which the knockout force is applied by the knockout mechanism according to the invention, is generally shown in FIG. 2 and indicated by the numeral 32. The magazine includes a pair of vertically extending and horizontally spaced stringers or forks 33, 34 being interconnected by and having interconnected therewith a plurality of tubular loaf molds 35. The molds here illustrated are rectangular in cross section and provided at one end with a peripheral flange 36 for receiving a slip-on cover 37 to close that end, as seen in FIG. 5. At the other end of each mold, a plastic plug 38 positionably movable within the mold closes the end. A ratchet take-up mechanism 39 controls the position of the plug 38. It should be appreciated here that neither the magazine assembly nor the ratchet plug and take-up mechanism form any part of the present invention, and these subject matters will be disclosed and claimed in separate applications also owned by the assignee of this application.

The plug 38 includes a generally square in cross section portion 42 conforming generally to the interior dimensions of the mold 35 and a pair of ratchet fingers 43, each having a plurality of ratchet teeth 44. While the plug portion 42 is guidably movable within the mold 35, the fingers 43 are guidably movable within a cage 45 defined by four guide bars 46. Each guide bar includes a pair of spaced guide surfaces 47, against which the plug fingers 43 ride. The inner ends of the guide bars are suitably connected, such as by welding, directly to the mold 35, while the outer ends are connected to a somewhat rectangularly shaped end support 48. Detents 50 coact with the ratchet teeth 44 and are spring-biased into engagement with the ratchet teeth by leaf springs 51. Each detent 50 is attached to one end of a leaf spring 51, while the other end of the leaf spring is secured to a pin 52 received by slots in the end support 48. Stop pins 53 are mounted in the end support 48 against which the leaf springs 51 bear. It will be appreciated here, with respect to the mechanism of the present invention for applying a squeezing force, any other suitable type of movably positionable plug and associated mechanism may be employed.

The magazine 32 is supported for movement along parallel opposed stationary rails or tracks 58 and 59 by means of wheels or rollers 60 and 61 respectively that are mounted on the upper ends of the forks 33 and 34 respectively. Also mounted at the upper ends of the forks 33 and 34 are indexing pins or dogs 52 and 63 which are engaged by a suitable index drive mechanism to index the magazines along the rails 58 and 59. The indexing drive mechanism here shown includes slotted vertically movable rails 64 and 65 and slotted horizontally and vertically movable drive rails 66 and 67. The locking rails 64 and 65, together with the movable rails 66 and 67, define a "walking beam" conveyer that is the subject of a separate application owned by the assignee of this application.

While the forks 33 and 34 are defined by a pair of spaced apart vertical plates, one on each side of the molds, a top horizontally extending cross plate 70 is provided to coact with a magazine anti-sway mechanism in the form of a pair of spring bars 71, FIG. 6, extending from the locking bar 64 and provided at its end with a pad 72 which engages the upper surface of the cross plate 70 when the locking bar is in the down position engaging the pin 62 and locking the magazine in position. The pad 72 applies a resilient force to each of the forks of the magazine to prevent or stop swaying of the magazine and essentially hold the magazine so that the molds are aligned along a vertical axis.

The overall arrangement of the product knockout station 18 is generally shown in FIG. 2, where the product knockout mechanism and receiving tray assembly generally includes a product knockout mechanism 80 and a receiving tray assembly 81. The product knockout mechanism includes a plurality of knockout bars 82, one each aligned with each of the molds of the magazine 32, while the receiving tray assembly includes a plurality of receiving trays 83, one each aligned with a mold 35 of the magazine of molds 32. It can now be appreciated that the knockout bars operate to knock out the loaf meat product from the molds 35 onto the receiving trays 83. Further, it can be appreciated that the knockout bars 82 coact with the movably positionable plug 38 within a mold and drive the plug from the end at the ratchet take-up mechanism 39 to the end where the cover 37 has been removed. It will also be recognized that the covers 37 are removed from the molds 35 at the position 16 which is just outside the chilling chamber, thereby readying the mold for knockout of the product when the magazine moves into the product knockout station, where the molds align with the knockout bars and the receiving trays. The covers may be suitably hung on pins on the leading sides of the molds to thereafter be carried through the other stations for processing and back to the stuffing station for further use.

Inasmuch as a considerable force is applied by the knockout bars to the magazine and the molds during the pushing of the plugs through the molds to remove the loaf product, it is necessary to counteract this force to prevent shifting or displacement of the magazine from the support rails 58 and 59. Accordingly, dead stops 86 and 87 are mounted on the receiving tray assembly for coaction with stop bars 88 and 89 carried on the fork 34 of the magazine.

The product knockout mechanism 80 further includes means for supporting and driving the knockout bars 82, including upstanding frame members or columns 91 and 92 between which are connected upper and lower slide rods 93 and 94. A vertically arranged knockout bar holder 95 is reciprocably slidably mounted on the guide bars 93 and 94. The inner end of the knockout bars 82 are connected to the bar holder 95 which is slidably supported on the guide bars 93 and 94. At the column 92, bearing 96 are provided through which the bars 82 are slidably supported.

The bar holder 95 for the knockout bars is reciprocally driven along the slide bars 93 and 94 by means of a hydraulic rotary actuator 100, which can best be seen in FIG. 7, and which drives a shaft 101 on which is mounted a spur gear 102 and a sprocket 103. The spur gear 102 is in meshing engagement with a spur gear 104 mounted on a second shaft 105 which also has mounted thereon a sprocket 106. An upper chain 107 is trained over the sprocket 106, as seen in FIG. 2, and also over a sprocket carried on a shaft 108 on the column 92. The chain 107 is connected to the upper end of the knockout bar holder 95. The sprocket 103 on shaft 101 drives a lower sprocket 109 through a chain 110. The lower sprocket 109 is mounted on a shaft 111 at the lower end of the column 91 and which also has mounted thereon a sprocket 112. A lower drive chain 113, as seen in FIG. 2, is trained over the sprocket 112 and also over a sprocket on a shaft 114 mounted below the shaft 108 on column 92. Further, the chain 113 is connected to the lower end of the vertical bar holder 95 for driving same. It can thereby be seen movement of the upper and lower ends of the bar holder is synchronized through the gear and chain drive arrangement. Accordingly, the rotary actuator 100 rotating in one direction will drive the bar holder with the knockout bars toward the mold 35 to knock out the loaf product within the molds and when rotated in the opposite direction will retract the knockout bars from the molds to their home position, as shown in FIG. 2.

A limit switch actuator is mounted on the bar holder 95 and includes a home position portion 118 which actuates the limit switch 119 mounted on column 91 and a knockout position portion 120 for actuating the limit switch 121 mounted on column 92.

The limit switches 119 and 121, together with an electrical control for the rotary actuator 100, are connected into a control 124 for operating the knockout mechanism. At the end of the knockout cycle when the knockout bars are within the molds, the limit switch actuating portion 120 actuates the limit switch 121 to cause reversal of the actuator 100 to retract the knockout bars to their home position. When the home position is reached, and the limit switch actuating portion 118 operates the limit switch 119, a signal is given to the overall programmer for the system to indicate the product knockout operation has been completed and the knockout bars are clear of the molds so that the magazine of molds at the knockout station can then advance to the next position.

The receiving trays 83 are suitably supported between upstanding and horizontally spaced apart columns 128 and 129. The receiving trays are pitched downwardly from the molds and are slightly lower than the respective molds to assist in the removal of the loaf meat products from the molds and movable stop plates 130 are provided on the outer lower ends of the trays to stop the loaves after they have been completely pushed onto the trays. As seen most clearly in FIG. 9, the stop plate 130 is pivotally mounted on the shaft 131 by being secured to a hub 132 carried on the shaft. The hub 132 is provided with indents 133 and 134 which coact with a spring-biased detent 135 to hold the stop plate 130 either in the closed position, as shown in FIG. 9, or in the open position. When in the open position, the indent 134 then is engaged by the detent 135. The detent 135 is supported on a spring arm 136 that is secured to a bracket 137 at the underside of the tray 83. The detent 135 is rounded in order to facilitate movement of the indents 133 and 134 out of engagement therewith.

It should be appreciated that the loaves of meat could be knocked out of the molds directly onto a loaf cart or other receiving means.

A splash deflector plate 140 extends between the inlet ends of the upper five receiving trays 83 and the outlet ends of the molds 35 essentially for the purpose of preventing liquids or materials discharged from the molds during the meat removal operation to fall down onto the next lower loaf meat product being removed from the next lower mold. The splash deflector plate extends below the ends of the molds and is provided with sufficiently wide side portions 141 to assure that nothing will be discharged onto the next lower loaf meat product. It can be appreciated that any suitable method may be employed for taking the loaves of meat from the receiving trays 83 and transporting them elsewhere for further processing, and that when they are removed from the trays, the stop plate 130 is pivoted downwardly to allow removal.

It will be understood that modifications and variations may be effected without departing from the scope of the novel concepts of the present invention, but it is understood that this application is to be limited only by the scope of the appended claims.

The invention is hereby claimed as follows:

1. In a system for continuously making a loaf food product including a magazine of loaf molds adapted to be filled with a stuffable food material, said magazine of molds including a plurality of interconnected vertically aligned horizontally extending tubular molds, wheels connected to the molds for movably supporting the magazine on rails for movement thereof along a path transverse the longitudinal axis of the molds, each mold having a plug at one end movably positionable within and through the mold and a removable cover over the other end, means for applying heat to the molds in a cooking station for cooking the food material, and means for applying a chilling action to the molds in a chilling station for chilling the food material following cooking thereof, a product knockout and receiving means comprising a plurality of knockout bars one aligned with each mold for engaging and pushing the plug to drive the product from the removable cover end of the molds, means driving the knockout bars in unison, and receiving means aligned with the molds for receiving the loaf food product.

2. The product knockout and receiving means defined in claim 1, wherein said receiving means includes a plurality of trays.

3. The product knockout and receiving means defined in claim 2, wherein the receiving trays are pitched downwardly from the molds and slightly lower than the respective molds and include a movable stop to hold the loaves in the trays.

4. The product knockout and receiving means defined in claim 2, wherein a splash deflector is positioned between the molds and the trays to prevent fluids discharged from the molds during removal of the meat from falling onto the loaves therebelow.

5. The product knockout and receiving means defined in claim 1, wherein said drive means includes a hydraulic actuator.

6. The product knockout and receiving means defined in claim 1, wherein said means driving the knockout bars in unison includes horizontally supported guide bar means, a knockout bar holder reciprocably movable on the guide bar means and having connection with the knockout bars, means guidably supporting said bars, and hydraulically powered means for reciprocably driving said bar holder.

7. The product knockout and receiving means defined in claim 6, which further includes control means for operating the hydraulically powered means.

8. The product knockout and receiving means defined in claim 7, which further includes means sensing the home position of the knockout bars.

9. The product knockout and receiving means defined in claim 8, which further includes means sensing the knockout position of the knockout bars.

10. The product knockout and receiving means defined in claim 1, which further includes stop means coating with the magazines to counteract the forces applied by the knockout bars.

11. The product knockout and receiving means defined in claim 10, which further includes means coacting with the magazine to prevent swaying.

12. In a system for continuously making a loaf food product including a generally horizontally extending tubular loaf mold adapted to be filled with a stuffable food material, means for movably supporting the mold for movement thereof along a path transverse the longitudinal axis of the mold, said mold having a plug at one end movably positionable therein and a removable cover over the other end, means for applying heat to the mold in a cooking station for cooking the food material, and means for applying a chilling action to the mold in a chilling station for chilling the food material following cooking thereof, a product knockout and receiving tray assembly comprising a knockout bar aligned with the mold for engaging and pushing the plug to drive the product from the removable cover end of the mold, means driving the knockout bar, and a receiving tray aligned with the mold for receiving the loaf food product.

13. The product knockout and receiving tray defined in claim 12, wherein the receiving trays are pitched downwardly from the molds and slightly lower than the respective molds and include a movable stop to hold the loaves in the trays.

* * * * *